US012783654B2

(12) United States Patent
Djeachandrane et al.

(10) Patent No.: US 12,783,654 B2
(45) Date of Patent: Nov. 3, 2026

(54) METHOD FOR MONITORING A SYSTEM

(71) Applicant: AIRBUS DS SLC, Elancourt (FR)

(72) Inventors: Abhishek Djeachandrane, Crépy-en-Valois (FR); Serge Delmas, Saint-Rémy-L'Honoré (FR); Alain Dubois, Saint-Rémy lès Chevreuse (FR); Abdelhamid Mellouk, Orsay (FR)

(73) Assignee: AIRBUS DS SLC, Elancourt (FR)

( * ) Notice: Subject to any disclaimer, the term of this patent is extended or adjusted under 35 U.S.C. 154(b) by 71 days.

(21) Appl. No.: 18/968,397

(22) Filed: Dec. 4, 2024

(65) Prior Publication Data

US 2025/0181713 A1 Jun. 5, 2025

(30) Foreign Application Priority Data

Dec. 5, 2023 (FR) ...................................... 2313544

(51) Int. Cl.
*G06F 21/55* (2013.01)
*G06N 20/00* (2019.01)

(52) U.S. Cl.
CPC ........... *G06F 21/554* (2013.01); *G06N 20/00* (2019.01); *G06F 2221/034* (2013.01)

(58) Field of Classification Search
CPC . G06F 21/554; G06F 2221/034; G06N 20/00; G06N 3/045; G06N 3/08; G06N 3/092
See application file for complete search history.

(56) References Cited

U.S. PATENT DOCUMENTS 11,977,536 B2 * 5/2024 Gonzalez Macias ........................ G06F 16/2365
12,567,316 B1 * 3/2026 Jacobs ................... G06N 20/00
2022/0382857 A1 * 12/2022 Liu ....................... G06F 21/552

(Continued)

FOREIGN PATENT DOCUMENTS

CN 117786575 A * 3/2024 ......... G06F 18/2433
KR 20230011117 A * 1/2023 ........... G06T 7/0002

(Continued)

OTHER PUBLICATIONS

Search Report as issued in French Patent Application No. FR2313544, dated Jul. 16, 2024.

(Continued)

*Primary Examiner* — J. Brant Murphy
*Assistant Examiner* — Christopher Lam
(74) *Attorney, Agent, or Firm* — CUSHMAN PARTNERS LLC

(57) ABSTRACT

A method for monitoring a system includes receiving a time sequence of data; determining presence or absence of an anomaly in the time sequence of data, absence of an anomaly corresponding to absence of a particular event occurring in the system and absence of an irregularity intrinsic to the time sequence of data, the determining using a machine learning model; if the presence of an anomaly has been determined, generating identification information relating to the anomaly; receiving, via the user interface, confirmation information relating to the presence or not of an anomaly in the time sequence of data; using the confirmation information and the identification information to train the machine learning model via a learning mechanism.

15 Claims, 4 Drawing Sheets

(56) References Cited

U.S. PATENT DOCUMENTS

2023/0156025 A1* 5/2023 Bracht .................. H04L 63/145
726/22
2024/0028019 A1* 1/2024 Thiruvenkatanathan ....................
G05B 23/0221
2025/0240308 A1* 7/2025 Waghorn .............. H04L 63/101
2026/0073310 A1* 3/2026 Muddu .................. G06N 20/20

FOREIGN PATENT DOCUMENTS

WO WO 2022/048779 A1 3/2022
WO WO-2022251837 A1 * 12/2022 ......... H04L 63/1425

OTHER PUBLICATIONS

Djeachandrane, A., et al., "QoE-based Situational Awareness-Centric Decision Support for Network Video Surveillance," ICC 2022—IEEE International Conference on Communications, IEEE, May 2022, pp. 335-340, XP034167370.

* cited by examiner

[Fig. 1]
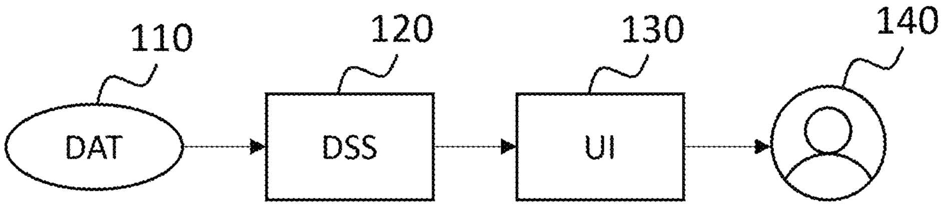
[Fig. 2]
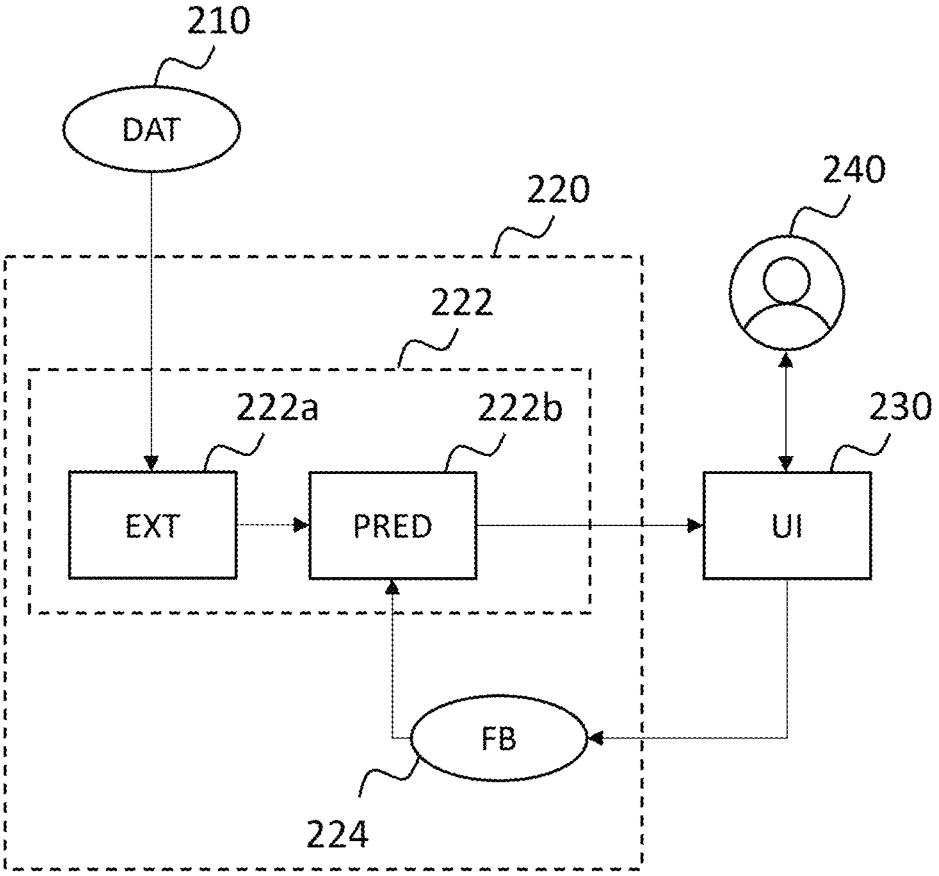

[Fig. 3]
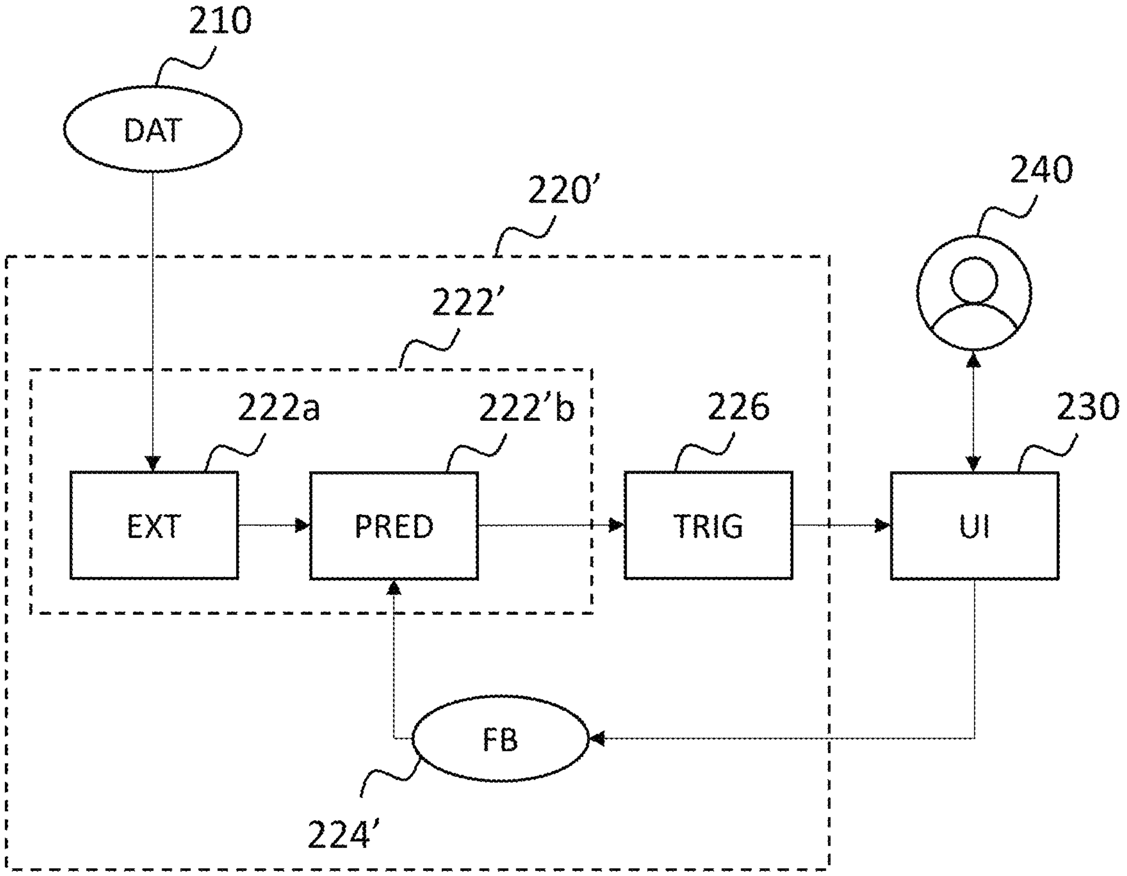

[Fig. 4]
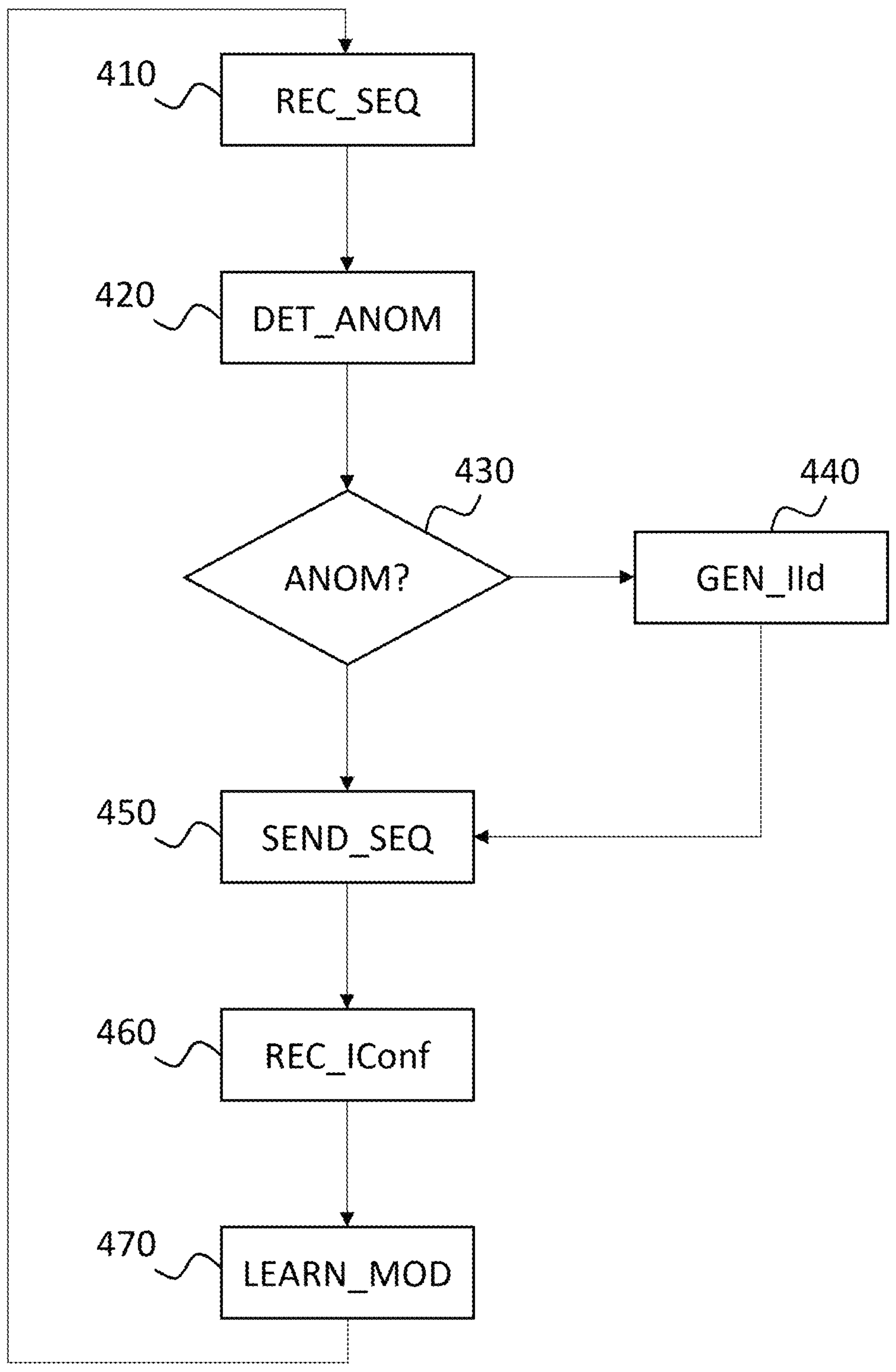

[Fig. 5]
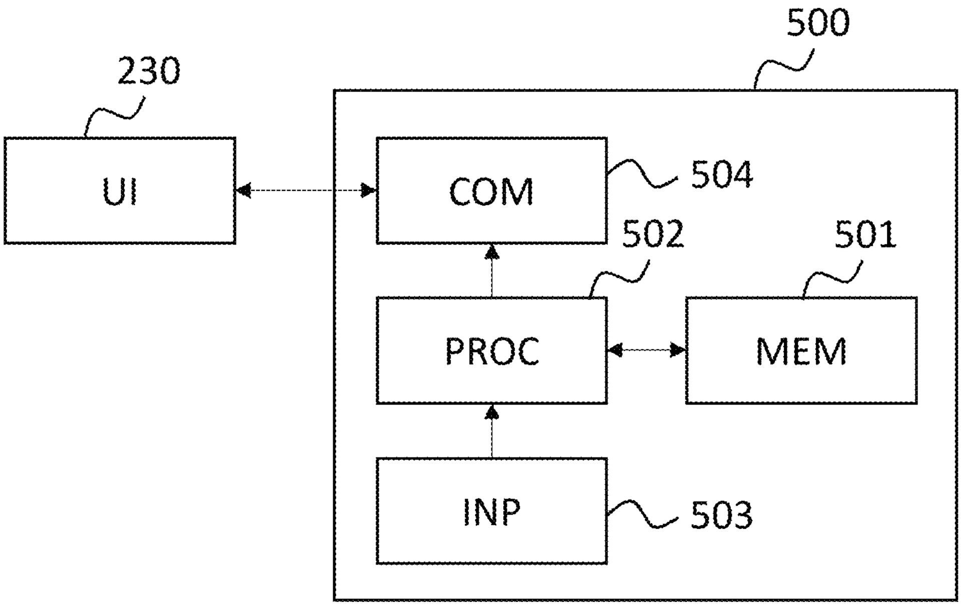

METHOD FOR MONITORING A SYSTEM

CROSS-REFERENCE TO RELATED APPLICATIONS

This application claims priority to French Patent Application No. 2313544, filed Dec. 5, 2023, the entire content of which is incorporated herein by reference in its entirety.

FIELD

The technical field of the invention is that of monitoring (surveillance) of a system, in particular monitoring the occurrence of a particular event in the system.

The invention thus relates to a method and a system for identifying an event in a time sequence of data representing a temporal evolution of the system.

BACKGROUND

The detection of particular events (for example undesirable events) in time sequences of data is important in terms of security and risk prediction.

By "time sequence of data", it is meant a set of temporally ordered data, each piece of data in the time sequence being associated with a respective time instant. Furthermore, each piece of data can be characterised by one or more spatial attributes such as a distance and/or a direction and/or a position. A time sequence of data according to the invention may be, for example, a video sequence (i.e. a time sequence of images), for example obtained using a video surveillance system, but the invention is not limited to such data. The time sequence data may also be, for example, sensor data, for example an electrocardiogram (ECG) signal, or a measurement associated with a system such as an aircraft engine or wing, for example a vibration or heat measurement.

An "event" typically designates abnormal system behaviour. For example, when the time sequence of data is a vibration signal, the event may correspond to an abnormal vibration in the system being analysed. According to another example, when the time sequence of data is a physiological signal such as an ECG, the event may correspond to an abnormal pattern in the organ in question (in the case of the ECG, the event may be an arrhythmia, for example). In the case the system being analysed is a video surveillance system, the event may correspond to an abnormal action in the scene captured by the video surveillance system, for example an explosion.

For example, the event sought to be detected may be one of a predetermined set of events. When the time sequence of data is a video sequence from a video surveillance system, this predetermined set of events may comprise, for example: an act of vandalism, an explosion, a riot, an accident, a person running or throwing an object. It is understood that this set of events depends on the application for which the surveillance system is being used. For example, according to the intended applications, the presence of a person running in the video sequence may or may not be an event that sought to be detected.

Of the state of the art, there are many monitoring (surveillance) systems designed to detect events in time sequences of data. One example of such a system is represented in FIG. 1, within the scope of video surveillance.

The video surveillance system shown in FIG. 1 comprises a Decision Support System (DSS) 120 and a User Interface (UI) 130. The decision support system 120 is configured to receive video sequences 110 as an input and to detect events in these video sequences 110. For example, the decision support system 120 may integrate a detection module comprising an automatic learning model trained to detect events automatically in video sequences. For example, such an automatic learning model may be previously trained by a supervised learning mechanism (wherein the training data are labelled sequences, the labels indicating whether or not an event is present in the sequence or in some images of the sequence).

When the decision support system 120 detects an event, it sends an alert to a user 140 via the user interface 130, and the user 140 confirms or denies presence of the event, for example by providing the user interface 130 with confirmation data. It is noted that confirmation by a user 140 is important in the case of critical applications, for which it is important on the one hand to reinforce reliability of detection by human confirmation and on the other hand to ensure that overall monitoring is not impacted in case of system failure (typically, that the user can take over temporarily if the system is unavailable, to avoid as far as possible not detecting an event while the server is unavailable).

Existing decision support systems perform well in terms of detecting particular events, but they generally need to be configured manually on the basis of the targeted application, especially with regard to the set of events sought to be detected, which is time-consuming and error-prone. Furthermore, such systems are heavily impacted when the data themselves are damaged. For example, in the case of very noisy images, the decision support system may not detect an event due to the presence of noise, and the user is not warned of the situation, which means that he is not asked to take over the analysis of the video sequence. In such a scenario, the event cannot be detected by the user as a last resort.

The invention improves the situation.

SUMMARY

One or more aspects of the invention offer a solution to the problems discussed previously, beneficially taking account not only of the quality of the identification of an event, but also of the quality of the sequence of data itself—the quality of the sequence of data having impact on the quality of detection. False negatives related to data degradation are thus largely avoided relative to methods of the state of the art.

One aspect of the invention thus relates to a computer-implemented method for monitoring a system comprising:

- receiving a time sequence of data representative of a temporal evolution of the system;
- determining presence or absence of an anomaly in said time sequence of data, an absence of an anomaly corresponding to absence of a particular event occurring in the system and absence of an irregularity intrinsic to the time sequence of data, said determining using a machine learning model trained to identify an anomaly in a time sequence of data;
- if the presence of an anomaly has been determined, generating identification information relating to said anomaly;
- sending said time sequence of data and, if the presence of an anomaly has been detected, said identification information relating to said anomaly, to a user interface;
- subsequent to said sending, receiving, via the user interface, confirmation information relating to the presence or not of an anomaly in the time sequence of data;

using said confirmation information and, if the presence of an anomaly has been determined, the identification information, to train the machine learning model via a learning mechanism.

By "system", it is meant any set sought to be monitored. In the case of video surveillance, the system may be a scene to be monitored, filmed by one or more cameras. The system can also be a subject's cardiac system (monitoring cardiac signals), an electrical apparatus, a motor or engine, etc.

By "time sequence of data representative of a temporal evolution of the system», it is meant a time sequence of data, said data relating to the operation or state of the system. In the case of video surveillance, this time sequence of data may be one or more video sequences of the scene to be monitored.

By "anomaly", it is meant any abnormal situation relating to the system analysed or to the sequence of data. There are two types of anomaly: "events" and "anomalies intrinsic to the sequence of data".

By "event", it is meant a particular behaviour in the system being analysed, sought to be detected. An event generally needs to be defined upstream (defining what the system is supposed to detect, according to the intended application). As described below, in the present invention, the event can beneficially be defined during data analysis. This saves the user time in defining events, avoids potential errors, and makes it possible to adapt to changes in the user's needs (what is or is not an event can thus be easily modified, transparently for the user).

By "irregularity intrinsic to the time sequence of data», it is meant an irregularity in the sequence of data itself. An intrinsic irregularity is distinct from the event, but can influence event detection.

Intrinsic irregularities are mainly of two types:

intrinsic irregularities related to the quality of the time sequence of data received; and intrinsic irregularities related to the integrity of the time sequence of data received.

Intrinsic irregularities related to the quality of the time sequence of data received are irregularities that relate to the piece of data but not its content, for example noisy data. Of course, the content is made less accessible by the presence of the noise, but the content is in accordance with reality.

Intrinsic irregularities related to the integrity of the time sequence of data received are irregularities that relate to the content itself, which has been modified. This is the case, for example, during a cyber-attack, when a sequence of data from another system (or from the same system, but at a different time) replaces the "real" sequence of data, or during deliberate obstruction of the scene (in the case of video surveillance, when an object is deliberately placed in the field to mask a zone of interest, in which an event occurs without being detected).

Aspects of the invention thus beneficially take account of several factors, which are never considered together in systems of prior art:

the event quality of detection-referred to as the "Quality of Prediction" (QoP). This is the ability of the machine learning model to detect an event in the sequence of data. This QoP is generally used alone in detection methods based on machine learning;

Quality of Experience (QoE), which represents the quality of the piece of data itself. This component is generally used in the telecommunications network community to evaluate quality of the network. In methods of prior art, it is never coupled with QoP (because these two components are not used in the same field).

In various aspects of the present invention, it is not a "standard" QoE that is used, but a so-called "specific" QoE, because it takes account not only of irregularities related to the quality of the piece of data (which is the standard QoE, related to the quality of the network), but also of irregularities related to the integrity of the piece of data (referred to here as the "augmented" QoE). Thus, the augmented QoE takes all the irregularities that could have an influence on event detection into account.

By "identification information", it is meant a piece of data indicating that an anomaly has been identified in the sequence of data by the machine learning model. This piece of data can be, for example, a binary indicator equal to 1 if an anomaly has been identified (without distinguishing between an event and an intrinsic irregularity). In other embodiments, this piece of data can be a pair of binary values, one of which is 1 if an event has been detected and the other is 1 if an intrinsic irregularity has been detected.

By "confirmation information", it is meant a piece of data indicating whether or not the user identifies an anomaly in the sequence of data.

In one or more embodiments, the learning mechanism comprises a reinforcement learning mechanism, in which a reward associated with the reinforcement learning mechanism is based on the confirmation information and, if the presence of an anomaly has been determined, the identification information.

In one or more embodiments, the identification information relating to said anomaly comprises a time piece of data or a spatial piece of data in the time sequence of data.

By "time piece of data», it is meant a piece of data for locating the anomaly in time. By "spatial piece of data», it is meant a piece of data for locating the anomaly in space. For example, in the case of video surveillance, the time piece of data may correspond to one or more time indices associated with the images related to the anomaly, and the spatial piece of data may correspond to the pixels of the images related to the anomaly.

In one or more embodiments, the particular event belongs to a set of events, said set of events being determined by the learning mechanism.

In other words, in these embodiments, the events sought to be detected are not predefined by the user, but are determined by the method itself.

In one or more embodiments, said time sequence of data is sent to the user interface only if the presence of an anomaly has been determined.

In these embodiments, the user is only appealed to when an anomaly has been detected. It is therefore the detection of an anomaly by the learning model that triggers an action by the user.

In one or more embodiments, the confirmation information is binary piece of data indicating whether or not an anomaly is present in the time sequence of data.

In these embodiments, the identification information can also be a binary piece of data indicating whether or not an anomaly is present in the time sequence of data.

In these embodiments, therefore, there is no distinction between an event and an intrinsic irregularity.

Alternatively, the identification information and the confirmation information are pairs of binary data, wherein one variable of the pair relates to the presence or not of an event and the other variable of the pair relates to the presence or not of an intrinsic irregularity in the time sequence of data. In these embodiments, therefore, there is a distinction between an event and an intrinsic irregularity.

In these alternative embodiments, identifying an anomaly in a time sequence of data by the machine learning model comprises:

identifying whether or not a particular event occurring in the system is present in the time sequence of data; and identifying whether or not an irregularity intrinsic to the time sequence of data is present in the time sequence of data;

wherein the identification information relating to said anomaly comprises:

a piece of data relating to an identification of the presence or not of a particular event in the time sequence of data; and a piece of data relating to the identification of the presence or not of an irregularity intrinsic to the time sequence of data;

and wherein the confirmation information comprises:

a piece of data relating to the presence or absence of a particular event in the time sequence of data; and a piece of data relating to the presence or absence of an irregularity intrinsic to the time sequence of data.

In one or more embodiments, the confirmation information further comprises a behavioural piece of data about a user.

By "behavioural data", it is meant a piece of data relating to the behaviour of a user using the monitoring method. For example, the piece of data may relate to user annoyance or dissatisfaction (via the use of a camera, microphone, pressure sensor on an input peripheral such as a touch screen, mouse or keyboard, etc.).

In one or more embodiments, the system is a scene and wherein the time sequence of data comprises at least one time sequence of images of at least one part of the scene. These embodiments thus correspond to applications of the invention in the field of video surveillance.

Another aspect of the invention relates to a device for monitoring a system comprising:

an input interface configured to receive a time sequence of data representative of a temporal evolution of the system;

a calculation circuit configured to:

determine presence or absence of an anomaly in said time sequence of data, absence of an anomaly corresponding to absence of a particular event occurring in the system and absence of an irregularity intrinsic to the time sequence of data, said determination using a machine learning model trained to identify an anomaly in a time sequence of data;

if the presence of an anomaly has been determined, generate identification information relating to said anomaly;

a communication interface configured to:

send said time sequence of data and, if the presence of an anomaly has been detected, said identification information relating to said anomaly, to a user interface;

subsequent to said sending, receive, via the user interface, confirmation information relating to the presence or not of an anomaly in the time sequence of data;

wherein the calculation circuit is further configured to use said confirmation information and, if the presence of an anomaly has been determined, the identification information, to train the machine learning model via a learning mechanism.

A non-transitory computer program, implementing all or part of the method described hereinbefore, installed on pre-existing equipment, is in itself beneficial.

Thus, an aspect of the present invention also relates to a non-transitory computer program including instructions to implement the method previously described, when this program is executed by a processor. The computer program can be stored in a non-transitory computer readable medium.

This program can use any programming language (for example, an object language or other), and be in the form of interpretable source code, partially compiled code or fully compiled code.

FIG. 4, described in detail hereinafter, can form the flowchart of the general algorithm of such a computer program.

The invention and its different applications will be better understood upon reading the following description and upon examining the accompanying figures.

BRIEF DESCRIPTION OF THE FIGURES

Further characteristics and benefits of the invention will become apparent upon reading the description, which can be read in conjunction with the figures. These figures are set forth by way of indicating and in no way limiting purposes.

FIG. 1 represents a monitoring system of the state of the art.

FIG. 2 represents an example of a monitoring system according to one embodiment of the invention.

FIG. 3 represents an example of a monitoring system according to one embodiment of the invention.

FIG. 4 represents a monitoring method according to one or more embodiments of the invention.

FIG. 5 represents an example of a monitoring device according to one or more embodiments of the invention.

DETAILED DESCRIPTION

FIG. 2 represents an example of a monitoring system according to one embodiment of the invention.

The monitoring system in FIG. 2 monitors an environment, also referred to as a "system" or "analysed system" (to distinguish it from the monitoring "system"). For example, within the scope of a video surveillance system, the system analysed is typically a scene, and the time sequences of data received are image sequences representing at least one part of this scene. Within the scope of monitoring the heart rate of a subject, the analysed system is the subject's heart and the time sequences of data are, for example, ECG data from the subject. Within the scope of monitoring vibration of a motor or engine, the system studied may be, for example, the motor or engine and the time sequences of data may be, for example, vibration signals sensed by vibration sensors located in the motor or engine.

The monitoring system of FIG. 2 comprises a decision support system 220 and a user interface 230. The decision support system 220 is configured to receive time sequences of data 210 as an input and to identify anomalies in these time sequences of data 210.

By "anomaly" in a time sequence of data, it is meant any abnormal situation relating to the time sequence of data. An anomaly may correspond to a particular detectable event in the time sequence of data-which can be described as extrinsic to the sequence of data itself, or to an irregularity intrinsic to the time sequence of data.

As mentioned above, an "event" designates a particular behaviour in the system being analysed. It is therefore an "abnormal" or "particular" event desired to be detected. In monitoring systems of the state of the art, the set of events that the decision support system should consider as abnormal (and therefore should detect) has to be defined during a pre-configuration step of the decision support system.

Within the scope of the present invention, it is noted that the set of abnormal events may also be defined during a pre-configuration step of the decision support system 220, but it may also be updated or even completely defined during use of the system, as described hereinafter.

An irregularity intrinsic to the time sequence of data may correspond, for example, to degradation of the data received. Such degradation may be, for example, the presence of excessive noise in the data (which may be due to various factors, such as environmental factors—e.g. the presence of fog or rain, contextual factors—e.g. the presence of smoke following an explosion, factors relating to the telecommunications network via which the data is retrieved—e.g. insufficient bandwidth, etc.), data piracy (e.g. the insertion into the initial sequence of data of a sequence of "fake" data from another surveillance system, for example) or data compromise (e.g. a deliberate occlusion in the scene to mask the presence of an event-typically a lorry hiding the part of the scene where an assault is taking place). Generally speaking, an irregularity intrinsic to the time sequence of data corresponds to an irregularity likely to degrade identification of an event in the time sequence of data.

Generally speaking, an irregularity intrinsic to the time sequence of data therefore corresponds to an irregularity in the data which are not the event itself, but which is likely to deteriorate quality of identification of the event.

As mentioned above, the decision support system 220 is therefore configured to identify at least one anomaly in a time sequence of data 210 received.

By "identifying an anomaly", it is meant here the fact of identifying the presence or absence of an anomaly in the time sequence of data, and possibly characterising the anomaly detected.

Within the scope of the invention, it is understood that an anomaly is present in the sequence of data when a particular event or irregularity intrinsic to the sequence of data is present. Conversely, an anomaly is absent from the sequence of data when the sequence of data comprises neither an event nor an irregularity. In other words, absence of anomaly corresponds to absence of a particular event in the sequence of data and absence of irregularity intrinsic to the sequence of data. It is noted that this approach significantly differs from existing monitoring systems, where the anomaly only corresponds to a particular event.

Identifying an anomaly may comprise an indicator (e.g. binary) of a presence or absence of the anomaly, and/or a temporally and/or spatially locating the anomaly.

Temporally locating an anomaly comprises, for example, one or more pieces of data relating to one or more time instants during which the anomaly is present in the time sequence of data (for example, an event start instant and/or an event end instant, a duration of the irregularity, etc.). For example, in a one-minute video sequence captured by a video surveillance system, a particular event may be detected at 3rd second of the video, or excessive data noise may be present between 3rd second and 20th second of the video sequence.

Spatially locating an anomaly comprises, for example, one or more data relating to one or more locations of the anomaly in the time sequence of data. For example, in a video captured by a multi-camera video surveillance system, an event may be detected on the video from only one of the cameras of the video surveillance system, and spatially locating the anomaly may comprise, for example, identifying the camera as well as data relating to a position of the event in one or more images of the video sequence (for example, successive positions of a person running).

The decision support system 220 typically comprises a detection module 222 using at least one previously trained automatic learning model to identify an anomaly in a time sequence of data. For example, such an automatic learning model may be previously trained by a supervised learning mechanism or by a reinforcement learning mechanism.

For example, the detection module 222 may comprise a first module 222*a* including a first automatic learning model trained to extract spatio-temporal patterns from a time sequence of data. For example, the first learning model may be a neural network previously trained on a database comprising annotated time sequences of data. The detection module 222 may further comprise a second module 222*b* configured to identify, from the spatio-temporal patterns extracted by the first module 222*a*, one or more anomalies in the time sequence of data. The second module 222*b* may include a second learning model to be trained on prediction data (i.e. on the time sequences received during the monitoring method according to the invention, as opposed to "learning" data used prior to the monitoring method, especially to train the first model of the first module 222*a*).

It is noted that the decision support system may also receive data other than the time sequence of data, and use these other data to identify presence of an anomaly—in particular presence of an irregularity. For example, this other data may comprise informative data relating to the network through which the time sequence of data is obtained, especially data relating to the stability of the network. The other data may also be data indicating that a cyber-attack has taken place, etc.

When the decision support system 220 identifies presence of an anomaly, it generates identification information relating to said anomaly identified. In the first embodiment of FIG. 2, the identification information comprises a binary piece of data indicating presence or absence of an anomaly in the sequence of data, for example: 0 if no anomaly has been identified, 1 if an anomaly has been identified (whatever the nature of the anomaly: particular event or irregularity intrinsic to the data). In other embodiments, especially the second embodiment described in detail hereinafter with reference to FIG. 4, the identification information can differentiate between the anomaly identified according to its nature: particular event or irregularity.

Furthermore, the identification information may comprise other data, especially temporal and/or spatial locating data as defined above.

In the first embodiment represented in FIG. 2, the decision support system 220 is configured to send the time sequence of data 210 to a user interface 230—whether or not the detection module 222 has identified an anomaly. When an anomaly has been detected, the identification information relating to this anomaly is further sent to the user interface 230.

The user interface may comprise a screen for displaying data, for example the time sequence of data in the case of a video surveillance system, or a system for monitoring a vibratory or ECG signal—in the latter cases, the signal variation curve over time may be displayed on the screen. An alert relating to any identification information may also be displayed, for example in the form of a message including descriptive data and/or spatio-time data relating to the anomaly, and/or in the form, for example, of a frame superimposed on the data to indicate to the user where the identified anomaly is situated. The user interface may of course comprise other components, for example a loudspeaker for "playing" content associated with the time sequence of data (for example the signal itself if the signal is an audio signal, or the audio part of the signal if the signal is a video signal) and/or with the identification information relating to an anomaly (for example an audible alert). The user interface also comprises any means or system for receiving data from the user, for example a mouse, keyboard, touch screen, etc.

The user 240 therefore has access to the content of the time sequence of data, which he/she can analyse in real time. It is noted that even when no anomaly has been detected, the user is able to analyse this content, and identify an anomaly in this content. When an anomaly has been detected, the user 240 also receives the identification information and can confirm or deny that it is an anomaly.

The user 240 can thus transmit information, referred to as confirmation information, to the decision support system 220 via the user interface 230. This confirmation information is information relating to the presence or absence of an anomaly in the sequence of data. It is noted that such confirmation data is not necessarily generated in response to the sending of identification information relating to an anomaly by the decision support system 220 to the user interface. It may be generated whereas the decision support system 220 has not identified an anomaly in the sequence of data, but the user 240 nevertheless identifies the presence of an anomaly (false negative), or whereas the user confirms absence of an anomaly in the sequence of data (true negative). When the decision support system 220 has identified an anomaly, the confirmation piece of data is used to confirm that it is indeed an anomaly (true positive) or, on the contrary, to indicate that there is no anomaly (false positive).

For example, the confirmation information may be 1 if an anomaly is actually present (according to the "ground truth" received via the user interface 230), and 0 otherwise, regardless of the value of the identification information.

It is noted that the confirmation information is not necessarily provided by the user 240 to the user interface 230. It may be generated indirectly, for example with the aid of a camera analysing facial expressions of the user 240 and/or with the aid of a microphone analysing sounds issued by the user 240. It is understood that the different ways of obtaining the confirmation information via the user interface 230 are not mutually exclusive and may be combined with each other.

A piece of data 224 derived from the confirmation information is then sent to the detection aid system 220—and in particular to the detection module 222, to be used to train at least one learning model of the detection module 222. For example, in the case where the detection module 222 comprises a first module 222*a* and a second module 222*b* as described hereinbefore, the derived piece of data 224 can be used to train the automatic learning model of the second module 222*b*.

For example, the machine learning model of the second module 222*b* may be trained via a reinforcement learning mechanism (wherein the model learns event detection from rewards-positive or negative-attributed to successive decisions). The derived piece of data 224 may be, for example, a reward to be provided to the automatic learning model of the second module 222*b*, which is, for example, 1 if the identification information and the confirmation information are identical, and 0 otherwise. During reinforcement learning, the module 222*b* therefore compares this binary reward with the prediction it had made, which may also be binary, and be 1 if the module had detected an anomaly and 0 otherwise.

Thus, the detection module 222 continues to learn during the phase of use of the system (as opposed to the prior phase of learning the model from training data).

This especially makes it possible to dispense with some or all of the pre-configuration of the decision support system 220, for example to define what an anomaly is in the context of the application desired by the user (this definition may be very different according to the applications—for example, a person running may be an event of interest for some applications but not for others). Thus, the configuration of the monitoring system is fine-tuned or even completely carried out during the phase of use of the system, in a way that is virtually transparent to the user. This saves pre-configuration time and avoids pre-configuration errors, enabling the system to adapt to any change in user needs and/or to adapt better to user needs (even if these have not changed).

Furthermore, it is noted that, according to the invention, the identification is not limited to an identification of an event, but encompasses any anomaly-especially an irregularity-which could influence detection of an event.

As defined above, the derived piece of data 224 beneficially makes it possible to take account both of parameters related to the quality and performance of the detection module 222 itself (in other words, parameters related to the architecture of the learning model)—referred to as "endogenous parameters", but also parameters which are not directly related to the architecture of the detection module, but which come from external phenomena-referred to as "exogenous parameters". To sum up, endogenous parameters are related to events, and exogenous parameters are related to irregularities intrinsic to the data (related either to the quality of the piece of data, or to the integrity of the data).

The endogenous parameters especially comprise, in the case of a neural network type architecture, weights associated with the different nodes. The endogenous parameters are those directly related to the detection of an event of interest. In existing machine learning algorithms, only these parameters are taken into account to train and/or improve the model.

Exogenous parameters can be of multiple types. For example, they may be related to the network over which the sequence of data are received. Indeed, a drop in bandwidth can lead to a drop in image quality, an increase in noise, packet loss, etc., all of which have a major impact on the data and are likely to impair or even prevent detection of events in these data. They can also be related to environmental factors, such as temperature or weather data. In the context of video surveillance, for example, driving rain or thick fog can seriously degrade images. They can also be related to an intervention whose aim is to deteriorate quality of the detection (for example, occlusion of part of the scene by a lorry with the aim of masking the event, hacking of data by insertion of corrupted data or data from a sequence of data without an event, etc.).

In the field of monitoring, such exogenous parameters are very important, as they influence the endogenous parameters. In the case of video surveillance, for example, if a lorry masks part of the scene, the detection module is unable to determine an event occurring in the masked part. However, the user has to be alerted to such masking in order to take adapted measures (changing the angle of view or camera, checking the places, etc.).

The invention beneficially integrates these exogenous parameters (in addition to the endogenous parameters) to improve overall quality of the monitoring system.

It is noted that endogenous parameters can generally be controlled (by modifying the weights of the neural network, for example), whereas exogenous parameters are, by nature, uncontrollable.

For this, the system provided in the present invention beneficially uses the derived piece of data 224, which integrates both quality of the prediction made (did the system detect an event properly?) and quality of the user's experience (did the system identify that the quality of the data had deteriorated?)

Thus, if t designates a time index (for example, a time associated with a signal sample or an image, or a period of time associated with several signal samples or several images), if at designates a decision made by the decision module 220 for the time index t and si $s_t$ designates the actual state (ground truth: presence or absence of an anomaly according to the user) for the time index t, the derived piece of data 224 is a function of both a variable $X_1(s_t,a_t)$ and a variable $X_2(s_t)$. This means that the derived piece of data incorporates not only the variable $X_1(s_t,a_t)$ which compares a prediction to a "ground truth", but also the variable $X_2(s_t)$ which reflects a quality of user experience.

For example, the reward associated with the reinforcement learning model 222*b* may be equal to the derived piece of data 224, which may be the sum of $X_1(s_t,a_t)$ and $X_2(s_t)$:

$$R(s_t, a_t) = X_1(s_t, a_t) + X_2(s_t).$$

The variable $X_1(s_t,a_t)$ variable is associated with the "Quality of prediction" QoP, which compares the prediction made by the trained model with the ground truth (i.e. the user's validation). The variable $X_2(s_t)$ is associated with the "Quality of Experience" QoE, which in the present invention comprises two components: a "standard" component, which is due especially to the quality of the network, and an "augmented" component, which takes account of all the other irregularities that can have an impact on the QoP. For example, this augmented component reflects the integrity of the piece of data (corruption of received data, deliberate obstruction of part of the scene in the case of video surveillance, etc.).

Endogenous parameters are those which are not directly related to the event, but which may have an impact on the identification of an event. Within the scope of the invention, they are represented by the presence of an irregularity in the time sequence of data.

An irregularity for the purposes of the invention can therefore be seen as an anomaly in the perception of the content of the sequence of data, while an event can be seen as an anomaly in the analysed content.

Such an irregularity may be, by way of example and in a non-limitative manner:

- an irregularity due to an involuntary phenomenon: presence of noise, interruption of the network due, for example, to severing the cables during works or due to an intervention on the network, instability of the network (reduction in bandwidth, congestion, etc.), weather phenomena (storm, rain, fog, etc.), natural disasters, etc.; or
- an irregularity due to a voluntary phenomenon (voluntarily caused by a third party): cyber-attack (which can lead to a change in the flow, data compromise, addition of noise, etc.), voluntary occlusion in the scene (in the case of video surveillance), appearance of a sound to mask the content of a sound piece of data, etc.

FIG. 3 represents an example of a monitoring system according to a second embodiment of the invention.

In FIGS. 2 and 3, the elements with the same numerical references are similar. Thus, the description of elements 210, 230 and 240 above remains valid.

In this second embodiment, a distinction is made between identification of an event and identification of an irregularity. More precisely, the information is no longer binary as in the first embodiment, but comprises two pieces of data, one relating to identification of an event in the time sequence of data and the other to identification of an irregularity in the time sequence of data.

Thus, the detection module 220' of FIG. 3 can be configured to identify, on the one hand, presence or absence of an event in the sequence of data and, on the other hand, presence or absence of an irregularity in the time sequence of data. In this embodiment, the identification information can therefore include two pieces of data: a piece of data relating to the presence or absence of an event in the sequence of data and a piece of data relating to the presence or absence of an irregularity in the sequence of data.

For example, such identification information may be: [0, 0] if no event is identified and no irregularity is identified; [0, 1] if no event is identified but an irregularity is identified; [1, 0] if an event is identified but no irregularity is identified; and [1, 1] if an event is identified and an irregularity is identified.

In a similar way, the confirmation information also integrates two pieces of data: a piece of data relating to the presence or absence of an event in the sequence of data and a piece of data relating to the presence or absence of an irregularity in the sequence of data (as indicated by the user).

The confirmation information can thus be, for example: [0, 0] if no event is present and no irregularity is present; [0, 1] if no event is present but an irregularity is present; [1, 0] if an event is present but no irregularity is present; and [1, 1] if an event is present and an irregularity is present.

The derived piece of data 224' may for example comprise two binary variables: a first binary variable relating to the presence of an event and a second variable relating to the presence of an irregularity. The first variable is 1 if the identification and confirmation information relating to an event match and 0 otherwise. The second variable is 1 if the identification and confirmation information relating to an irregularity match and 0 otherwise. The derived piece of data 224' can thus be defined as follows, and can correspond to the reward supplied to the learning model of the module 222'*b*:

| Identification information | Confirmation information | Derived piece of data |
|---|---|---|
| [0; 0] | [0; 0] | [1; 1] |
| | [0; 1] | [1; 0] |
| | [1; 0] | [0; 1] |
| | [1; 1] | [0; 0] |
| [0; 1] | [0; 0] | [1; 0] |
| | [0; 1] | [1; 1] |
| | [1; 0] | [0; 0] |
| | [1; 1] | [0; 1] |
| [1; 0] | [0; 0] | [0; 1] |
| | [0; 1] | [0; 0] |
| | [1; 0] | [1; 1] |
| | [1; 1] | [1; 0] |
| [1; 1] | [0; 0] | [0; 0] |
| | [0; 1] | [0; 1] |
| | [1; 0] | [1; 0] |
| | [1; 1] | [1; 1] |

The module 222*a* may be the same for both embodiments. On the other hand, the module 222'*b* receives the new derived piece of data 224' as an input and uses this new derived piece of data 224' and the identification information to learn according to one learning mechanism, for example a reinforcement learning mechanism.

The distinction made between both possible types of anomaly allows several options for training the module 222'*b*: it can be decided that the new derived piece of data 224' is used to train the module 222'*b* as soon as an anomaly is identified (even if it is an irregularity), or that the new derived piece of data 224' is only used to train the module 222'*b* when an event (but not an anomaly) is identified. According to the latter option, the module 222'*b* only learns when the data quality is correct.

The monitoring system represented in FIG. 3 further comprises a trigger module 226 which can be configured to issue an alert to the user interface 230 when an anomaly is detected by the detection module 222'. In one embodiment, the confirmation information is generated only when an alert has been issued. In other words, the user 240 only intervenes to confirm or deny the presence of an anomaly, and if the anomaly is an irregularity, the user 240 can further take the necessary actions. Thus, the user 240 is less appealed to (which is particularly beneficial for applications with rare anomalies).

It is understood that such a trigger module can also be used within the scope of the monitoring system of FIG. 2. However, in the monitoring system of FIG. 2, the user 240 does not know what type of anomaly is being detected.

FIG. 4 represents a monitoring method according to one or more embodiments of the invention. The monitoring method of FIG. 4 is typically implemented by the detection module 220, 220'.

In a step 410, a time sequence of data relating to a system, referred to as the "analysed system" above, is received.

In a step 420, this time sequence of data is analysed to identify any anomaly therein. During this step 420, it is determined whether an anomaly is present or whether no anomaly is present in the time sequence of data received in step 410. As mentioned hereinbefore, it is concluded that there is no anomaly when no particular event or irregularity intrinsic to the data in the time sequence of data is determined. In opposition thereto, it is concluded that an anomaly is present if a particular event is identified or if an irregularity is identified.

Step 420 is conventionally implemented using a previously trained machine learning model to identify, in a time sequence of data, presence or absence of an anomaly in said time sequence of data.

In a step 430, it is checked whether or not an anomaly has been identified in the time sequence of data and if an anomaly has been identified, a step 440 is implemented, during which identification information relating to said identified anomaly is generated, as detailed hereinbefore with reference to FIGS. 2 and 3.

It is noted that, in some embodiments, identification information can also be implemented when no anomaly has been identified. In such embodiments, the identification information may, for example, be set to a reference value corresponding to absence of identification of an anomaly.

In a step 450, the time sequence of data is sent to a user interface (element 230 in FIGS. 2 and 3). If an anomaly has been identified in step 420, step 450 also comprises issuing the identification information generated in step 440 to the user interface.

In some embodiments, the time sequence of data is only sent when the identification information has been generated in step 440, i.e. when an anomaly has been identified in step 420.

Subsequent to step 440 (and possibly 450), confirmation information relating to the presence or not of an anomaly in the time sequence of data is received via the user interface in a step 460, as detailed hereinbefore with reference to FIGS. 2 and 3.

In some embodiments, this confirmation information is only received when the identification information has been generated in step 440, i.e. when an anomaly has been identified in step 420.

This confirmation information is then used in a step 470 to train the machine learning model via a learning mechanism, for example a reinforcement learning mechanism.

For example, as detailed hereinbefore, a piece of data 224, 224' derived from the confirmation information received in step 460 may be used as a reward for the reinforcement learning mechanism. In particular, this derived piece of data 224, 224' can be determined from the confirmation information and the identification information, when the latter is available.

Where no identification information is available (for example in embodiments where identification information is generated only if an anomaly has been identified, and no anomaly has been identified in step 420), the piece of data 224, 224' may be determined from the confirmation information and one or more reference values associated with non-identification of an anomaly in step 420. For example, in the example described with reference to FIG. 2, assuming that the confirmation information is a binary variable which is 1 if an anomaly is present and 0 otherwise: if no anomaly has been detected in step 420 and the confirmation information received is 1, the confirmation information can be compared with a reference value set to 0 (since no identification information has been generated). The reward associated with the learning model of the module 222*b*, 222'*b* can thus be based on:

- the confirmation information received in step 460; and
- the identification information if it has been generated in step 440, and of the reference value otherwise.

In embodiments where the identification and confirmation information comprise a piece of data relating to the presence or absence of a particular event and a piece of data relating to the presence or absence of an irregularity, the confirmation information can be used to train the machine learning model only if the confirmation data indicates that an event is actually present in the time sequence of data.

Steps 410 to 470 can of course be iteratively implemented, so as to monitor the system being analysed "continuously", sequence by sequence.

FIG. 5 represents an example of a monitoring device according to one or more embodiments of the invention.

In these embodiments, the monitoring device includes a computer 500, comprising a memory 501 for storing instructions to implement the method and temporary data for carrying out different steps of the methods previously described. The computer 500 can especially perform the functions of the detection module 220, 220' of FIGS. 2 and 3.

The computer 500 further includes a circuit 502. This circuit may be, for example, a processor able to interpret instructions in the form of a computer program, an electronic board whose method steps are described in silicon, or even a programmable electronic chip such as an FPGA (Field-Programmable Gate Array) chip.

The computer 500 includes an input interface 503 for receiving the time sequence of data, and a communication interface 504 for communicating with a user interface (which may or may not form part of the monitoring device), and especially for sending the time sequence of data and the possible identification information to the user interface 230 and for receiving the confirmation information from the user interface 230.

Furthermore, the block diagram set forth in FIG. 4 is a typical example of a program in which some instructions can be carried out from the device described. As such, FIG. 4 may correspond to the flowchart of the general algorithm of a computer program for the purposes of the invention.

It will be appreciated that the present invention is not limited to the embodiments described hereinbefore by way of example. It encompasses other alternatives.

Various aspects of the invention address the technical problem of improving the detection of anomalies in time sequences of data by leveraging a machine learning model trained not only on typical event detection but also on identifying irregularities intrinsic to the data. Traditional monitoring systems fail to address the interplay between exogenous data quality factors (such as noise, network instability, or malicious interference) and endogenous detection capabilities (such as neural network prediction accuracy). By integrating Quality of Prediction (QoP) with an augmented Quality of Experience (QoE) that considers both data integrity and prediction reliability, various aspects of the invention ensure accurate and resilient anomaly detection. This approach moves beyond mere abstract data processing by tailoring the monitoring system to handle real-world challenges in noisy or compromised data environments.

In various aspects of the invention, the disclosed system implements a novel machine learning framework comprising a dual-module architecture, where the first module extracts spatio-temporal patterns from the input data, and the second module applies contextual reasoning to differentiate between true anomalies and artifacts introduced by degraded data quality. This specific implementation ensures the system is not merely processing data generically but is addressing a concrete technical challenge tied to system integrity and operational reliability. The feedback loop for user confirmation, which dynamically updates the learning model using reinforcement learning, represents a further layer of specificity, ensuring the system continually evolves to meet application-specific requirements without manual reconfiguration.

Various aspects of the invention provide substantial technological benefits over existing solutions. By dynamically adapting to user feedback, the system reduces the likelihood of false positives and negatives, enhancing operational accuracy. The integration of augmented QoE ensures the system remains functional and effective even in suboptimal data conditions, such as noisy environments or cyber-attacks. Additionally, the ability to spatially and temporally locate anomalies provides actionable insights that are immediately applicable in various domains, such as video surveillance, industrial monitoring, and medical diagnostics. These enhancements demonstrate that the invention is not directed to an abstract idea but rather to a specific, technological solution designed to improve the reliability and accuracy of anomaly detection in complex systems.

This detailed description highlights how various aspects of the invention improve the functioning of monitoring systems through technological innovations in anomaly detection.

Expressions such as “comprise”, “include”, “incorporate”, “contain”, “is” and “have” are to be contre in a non-exclusive manner when interpreting the description and its associated claims, namely construed to allow for other items or components which are not explicitly defined also to be present. Reference to the singular is also to be construed in be a reference to the plural and vice versa.

The articles “a” and “an” may be employed in connection with various elements and components of compositions, processes or structures described herein. This is merely for convenience and to give a general sense of the compositions, processes or structures. Such a description includes “one or at least one” of the elements or components. Moreover, as used herein, the singular articles also include a description of a plurality of elements or components, unless it is apparent from a specific context that the plural is excluded.

As used herein in the specification and in the claims, the phrase “at least one”, in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified.

A person skilled in the art will readily appreciate that various features, elements, parameters disclosed in the description may be modified and that various embodiments disclosed may be combined without departing from the scope of the invention. For example, various aspects of the present disclosure may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Having described above several aspects of at least one embodiment, it is to be appreciated various alterations, modifications, and improvements will readily occur to those skilled in the art. Such alterations, modifications, and improvements are intended to be aspects of this disclosure. Accordingly, the foregoing description and drawings are by way of example only.

The invention claimed is:

1. A computer-implemented method for monitoring a system to detect presence of an event in a time sequence of data representative of a temporal evolution of the system, comprising:

receiving the time sequence of data;

determining presence or absence of an anomaly in said time sequence of data, absence of the anomaly corresponding to absence of a particular event occurring in the system and absence of an irregularity intrinsic to the time sequence of data, said determining using a machine learning model trained to identify the anomaly in the time sequence of data, said determining comprising:

identifying whether or not the particular event occurring in the system is present in the time sequence of data; and identifying whether or not the irregularity intrinsic to the time sequence of data is present in the time sequence of data, the irregularity intrinsic to the time sequence of data being an irregularity in the time sequence of data itself that is distinct from the particular event occurring in the system;

in response to determining that the anomaly is present, generating identification information relating to said anomaly comprising:

a piece of data relating to an identification of whether or not the particular event is present in the time sequence of data; and a piece of data relating to an identification of whether or not the irregularity intrinsic to the time sequence of data is present in the time sequence of data;

sending said time sequence of data and, if when the presence of the anomaly has been determined, said identification information relating to said anomaly to a user interface;

subsequent to said sending, receiving, via the user interface, confirmation information relating to the presence or not of the anomaly in the time sequence of data, the confirmation information comprising:

a piece of data relating to whether or not the particular event is present in the time sequence of data; and a piece of data relating to whether or not the irregularity intrinsic to the time sequence of data is present in the time sequence of data;

using said confirmation information and, when the presence of the anomaly has been determined, the identification information, to train the machine learning model via a learning mechanism.

2. The method according to claim 1, wherein the learning mechanism comprises a reinforcement learning mechanism, wherein a reward associated with the reinforcement learning mechanism is based on the confirmation information and, when the presence of the anomaly has been determined, on the identification information.

3. The method according to claim 1, wherein the identification information relating to said anomaly comprises a time piece of data or a spatial piece of data in the time sequence of data.

4. The method according to claim 1, wherein the particular event belongs to a set of events, said set of events being determined by the learning mechanism.

5. The method according to claim 1, wherein the sending of said time sequence of data to the user interface is implemented only if when the presence of the anomaly has been determined.

6. The method according to claim 1, wherein the confirmation information further comprises a behavioural piece of data of a user.

7. The method according to claim 1, wherein the system is a scene and wherein the time sequence of data comprises at least one time sequence of images of at least one part of the scene.

8. A device for monitoring a system to detect presence of an event in a time sequence of data representative of a temporal evolution of the system, comprising:

an input interface configured to receive the time sequence of data;

a calculation circuit configured to:

determine presence or absence of the anomaly in said time sequence of data, absence of the anomaly corresponding to absence of a particular event occurring in the system and absence of an irregularity intrinsic to the time sequence of data, said determining using a machine learning model trained to identify the anomaly in the time sequence of data, said determining comprising:

identify whether or not the particular event occurring in the system is present in the time sequence of data; and identify whether or not the irregularity intrinsic to the time sequence of data is present in the time sequence of data, the irregularity intrinsic to the time sequence of data being an irregularity in the time sequence of data itself that is distinct from the particular event occurring in the system;

in response to determining that the anomaly is present, generate identification information relating to said anomaly comprising:

a piece of data relating to an identification of whether or not the particular event is present in the time sequence of data; and a piece of data relating to an identification of whether or not the irregularity intrinsic to the time sequence of data is present in the time sequence of data;

a communication interface configured to:

send said time sequence of data and, when the presence of the anomaly has been determined, said identification information relating to said anomaly to a user interface;

subsequent to said sending, receive, via the user interface, confirmation information relating to the presence or not of the anomaly in the time sequence of data, the confirmation information comprising:

a piece of data relating to whether or not the particular event is present in the time sequence of data; and a piece of data relating to whether or not the irregularity intrinsic to the time sequence of data is present in the time sequence of data;

wherein the calculation circuit is further configured to use said confirmation information and, when the presence of the anomaly has been determined, the identification information, to train the machine learning model via a learning mechanism.

9. A non-transitory computer program product including instructions to implement the method according to claim 1 when the instructions are executed by a processor.

10. The method according to claim 1, wherein the irregularity intrinsic to the time sequence of data relates to a quality or to an integrity of the time sequence of data as received, and is liable to degrade said identifying of whether or not the particular event is present in the time sequence of data.

11. The method according to claim 10, wherein the irregularity intrinsic to the time sequence of data comprises at least one of: noise in the time sequence of data; a degradation of the time sequence of data caused by a telecommunications network via which the time sequence of data is obtained; an insertion into the time sequence of data of data originating from a source other than the system; and an occlusion of a part of the system.

12. The method according to claim 2, wherein the reward comprises a first binary variable and a second binary variable, the first binary variable taking a first value when the piece of data of the identification information relating to the identification of whether or not the particular event is present and the piece of data of the confirmation information relating to whether or not the particular event is present match, and taking a second value otherwise, and the second binary variable taking the first value when the piece of data of the identification information relating to the identification of whether or not the irregularity intrinsic to the time sequence of data is present and the piece of data of the confirmation information relating to whether or not the irregularity intrinsic to the time sequence of data is present match, and taking the second value otherwise.

13. The method according to claim 1, wherein the machine learning model comprises a first module comprising a first machine learning model trained, prior to said receiving, to extract spatio-temporal patterns from the time sequence of data, and a second module comprising a second machine learning model configured to identify the anomaly from the spatio-temporal patterns extracted by the first module, and wherein said training trains the second machine learning model.

14. The method according to claim 1, further comprising receiving other data distinct from the time sequence of data, the other data comprising at least one of data relating to a stability of a telecommunications network via which the time sequence of data is obtained and data indicating that a cyber-attack has taken place, wherein said identifying whether or not the irregularity intrinsic to the time sequence of data is present uses the other data.

15. The method according to claim 1, wherein the confirmation information is used to train the machine learning model only when the piece of data of the confirmation information relating to whether or not the particular event is present indicates that the particular event is present.

* * * * *